Patented Dec. 26, 1922.

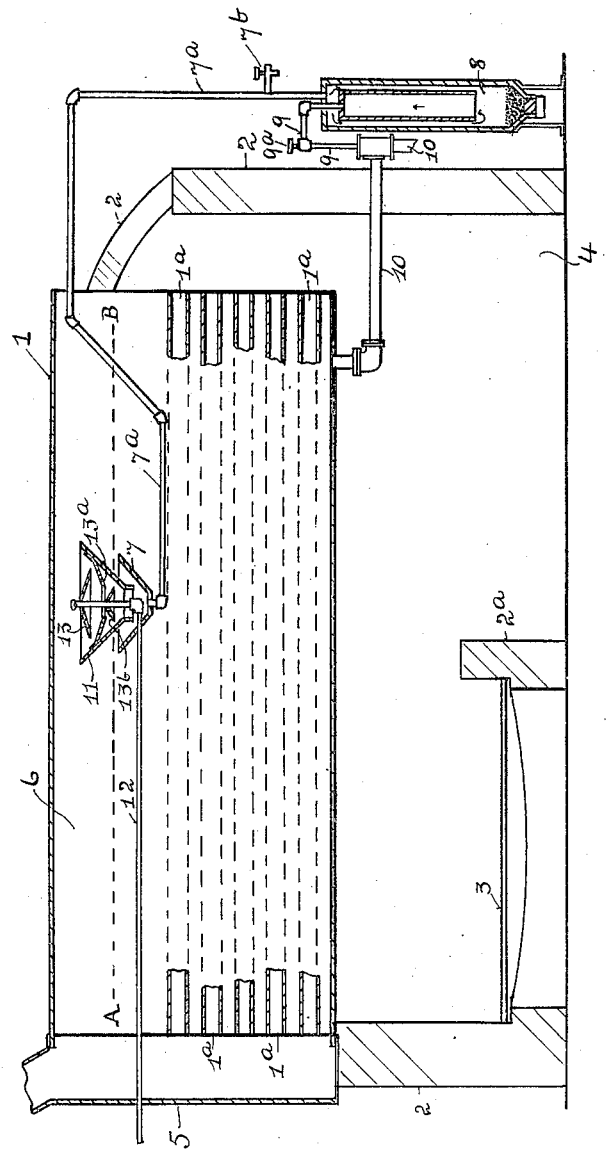

1,440,103

UNITED STATES PATENT OFFICE.

JAMES D. REEKIE, OF DULUTH, AND GEORGE M. CROSSEN, OF MINNEAPOLIS, MINNESOTA.

METHOD AND MEANS FOR PURIFYING WATER FOR STEAM BOILERS.

Application filed February 28, 1917. Serial No. 151,456.

*To all whom it may concern:*

Be it known that we, JAMES D. REEKIE, a citizen of the United States, residing at Duluth, in the county of St. Louis and State of Minnesota, and GEORGE M. CROSSEN, a citizen of the United States, residing at Minneapolis, in the county of Hennepin and State of Minnesota, have jointly invented new and useful Improvements in Methods and Means for Purifying Water for Steam Boilers; and we do hereby declare the following to be a full, clear, and exact description of the invention, such as will enable others skilled in the art to which it appertains to make and use the same.

Our invention relates to scale preventing means for steam boilers, and has for its object the precipitation and removal of scale forming minerals in the feed water before it has entered the main body of water in the boiler. Our method of preventing scale in the boiler, is to heat the feed water in a mineral precipitator within the boiler and to cause said heated feed water and the precipitates therein to flow from said precipitator into a settling tank outside of such boiler in which settling tank said precipitates are collected and retained, and from whence the water is returned to the boiler. It has for a further object the trapping of oil accompanying the feed water, and the removal of such oil before it has entered the main body of boiler water. With these and other objects in view, it consists of the method and the means, constructions, combinations and arrangements of parts hereinafter described and claimed.

In the drawings, the figure is a vertical, longitudinal central section of a furnace and boiler in which our invention is employed.

In the drawings, 1 is a boiler, mounted on a furnace of any suitable structure, as one provided with outer walls 2, a grate 3, and a bridge wall 2ª. Extending through said boiler are any suitable number of fire flues 1ª. One end of said boiler extends into a gas combustion chamber 4 of said furnace, from which the heated gases enter said flues, and the opposite end of said boiler extends into a smoke box 5 of any suitable construction, into which the burnt gases and smoke are discharged from said flues. The normal surface of the main body of water within said boiler is represented by the line A—B, the level of which may, however, fluctuate under various conditions. Above said water is a steam space 6. Positioned within said boiler, with its upper end preferably a short distance below the normal level of said main body of water is a scale cup 7 of any suitable structure, preferably funnel-shaped with the contracted end down. The lower end of said scale cup is adapted to discharge into a drain pipe 7ª connected thereto which pipe extends out of said boiler and furnace and into the upper end of a settling tank 8 into which it discharges. Extending into said settling tank at or near its upper end is an overflow pipe 9, which is connected at its opposite end to the blow-off pipe 10 of said boiler, thus the excess water from the settling tank may flow into the boiler through said blow-off pipe.

In said pipe 7ª is a faucet or blow-off valve of any suitable structure, as 7ᵇ, and in said pipe 9 is a shut-off valve of any suitable structure, as 9ª.

Positioned above said cup 7, and extending at its open upper end into said steam space and at its lower open end into said cup is a water conductor 11, of any suitable structure, preferably funnel-shaped, with its smaller end down. Said conductor is adapted to discharge freely into said cup. Extending into said boiler from an ejector pump (not shown, but well known to the art) or from any suitable external source of water supply, is an injector or water feed pipe 12 which is preferably adapted to discharge upon a water table 13 positioned above or within said conductor, which table is adapted to spread the water and discharge it downward into said conductor. If desired one or more other water tables as 13ª, 13ᵇ, may be positioned within said conductor to receive and discharge such water downwardly in succession, or if desired, said water tables may all be omitted. The lower end of said conductor terminates a short distance above the lower end of said cup, which cup is preferably kept filled with water from said conductor and from the main body of water in said boiler. Thus the lower end of the conductor 11 will normally be water sealed, and any oil which may appear in the feed water will thereby be trapped in said conductor, but any scale forming minerals will be granulated by the heat and will drop into the cup and be carried off by the drain pipe to the settling tank. At the same time any surface impurities in the main body of boiler water may be drawn into said cup, which thus also operates as a skimmer. The oil may be disposed of occasionally by closing the valve 9ª and opening the faucet or blow-off valve 7ᵇ, thus permitting the oil to be blown through the pipe 7ª and out through the valve 7ᵇ.

While we have thus described a funnel-shaped cup and conductor, we do not desire to be limited to that form, or to any particular number of water tables except as to such claims wherein, if any, such form or number are particularly specified.

In operation, the feed water is highly heated by the passage of the feed pipe through the boiler, and by the flow of the water through the steam and over the steam heated water tables and through the conductor and cup. The heat operates to crystalize, or granulate or precipitate the scale-forming minerals or other heavy impurities in the water, which settle in said cup and are drawn off to the settling tank.

It will be obvious that said structure may be modified in form and in minor details within the scope and spirit of certain of our claims.

What we claim is—

1. The method of purifying water for steam boilers, consisting of causing the precipitation of scale-forming minerals in the feed water by heating the feed water within the boiler before said feed water has mixed with the main body of boiler water, trapping the oil from said feed water within the boiler before either said oil or said feed water have mixed with the main body of boiler water, drawing said feed water and mineral precipitates out of said boiler free from said oil, trapping said mineral precipitates outside of said boiler, returning the feed water approximately free of said precipitates to the main or free body of water within the boiler, and occasionally blowing said trapped oil out of said boiler.

2. The combination with a steam boiler, of a feed water receptacle positioned therein, said receptacle comprising a compartment open at the upper end and extending at the upper end below the normal level of the main body of water in said boiler, a second compartment terminating at its lower end within the first said compartment, the lower end of said second compartment extending below the normal level of the main body of water within said boiler, the upper end of said second compartment extending above the upper end of the first said compartment and above the normal level of the main body of water in said boiler, said second compartment being adapted to discharge through its lower end into the first said compartment, said first compartment being also adapted to receive water at its upper end from the main body of water in said boiler, a feed pipe extending into said boiler, said feed pipe being adapted to discharge into said second compartment, a discharge pipe communicating at one end with the lower end of said first compartment and extending outside of said boiler, means interposed between the outer end of said discharge pipe and said boiler for delivering the discharge water to the main water chamber within said boiler, and a blow-off cock communicating with said discharge pipe outside of said boiler.

3. The combination with a steam boiler of a feed water receptacle positioned therein, said receptacle comprising a compartment open at the upper end and extending at the lower end below the normal level of the main body of water in said boiler, a second compartment terminating at its lower end within the first said compartment, the lower end of said second compartment extending below the normal level of the main body of water within said boiler, the upper end of said second compartment extending above the upper end of said first compartment and above the normal level of the main body of water in said boiler, said second compartment being adapted to discharge through its lower end into the first said compartment, said first compartment being also adapted to receive water from the main body of water in said boiler, a feed pipe extending into said boiler, said feed pipe being adapted to discharge into said second compartment, a discharge pipe communicating at one end with the lower end of said first compartment and extending outside of said boiler, and a blow-off cock communicating with said discharge pipe outside of said boiler.

In testimony whereof, we hereunto affix our signatures in presence of two witnesses.

JAMES D. REEKIE.
GEORGE M. CROSSEN.

Witnesses:
J. M. SULLIVAN,
RALPH HENRY DAY.